Jan. 14, 1941.   J. M. GWINN, JR   2,228,311
AIRCRAFT
Filed Oct. 1, 1937   3 Sheets-Sheet 1
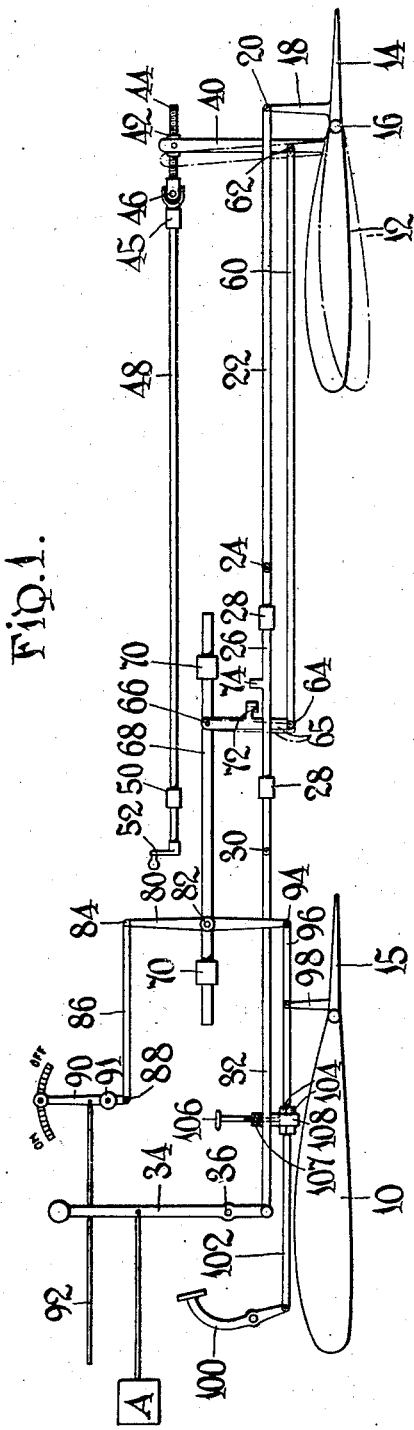
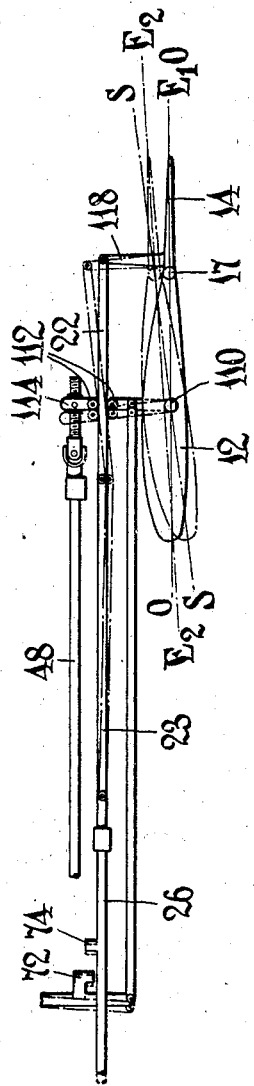
INVENTOR
Joseph M. Gwinn, Jr.
BY
Beau, Brooks, Buckley + Beau.
ATTORNEYS Jan. 14, 1941. J. M. GWINN, JR 2,228,311
AIRCRAFT
Filed Oct. 1, 1937 3 Sheets-Sheet 2
Fig.3. Fig.4.
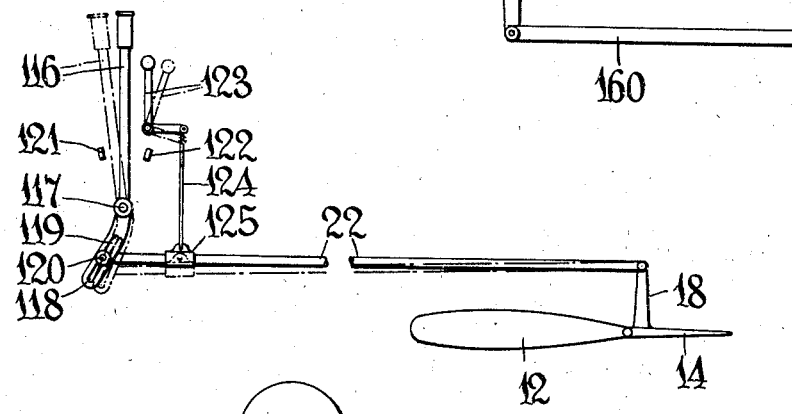
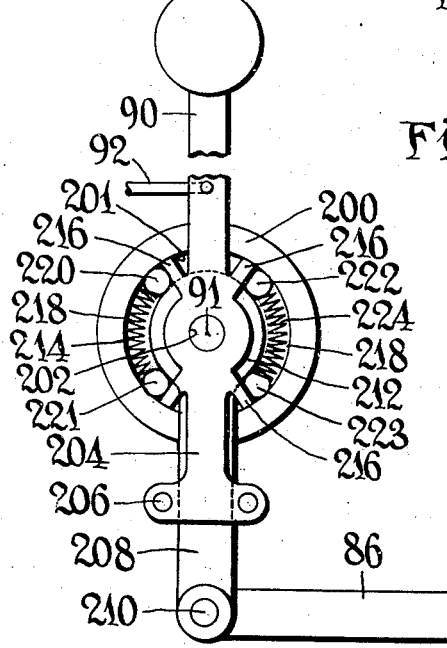
Fig.5.
INVENTOR
Joseph M. Gwinn, Jr.
BY
Bean, Brooks, Buckley & Bean.
ATTORNEYS Jan. 14, 1941.  J. M. GWINN, JR  2,228,311
AIRCRAFT
Filed Oct. 1, 1937  3 Sheets-Sheet 3
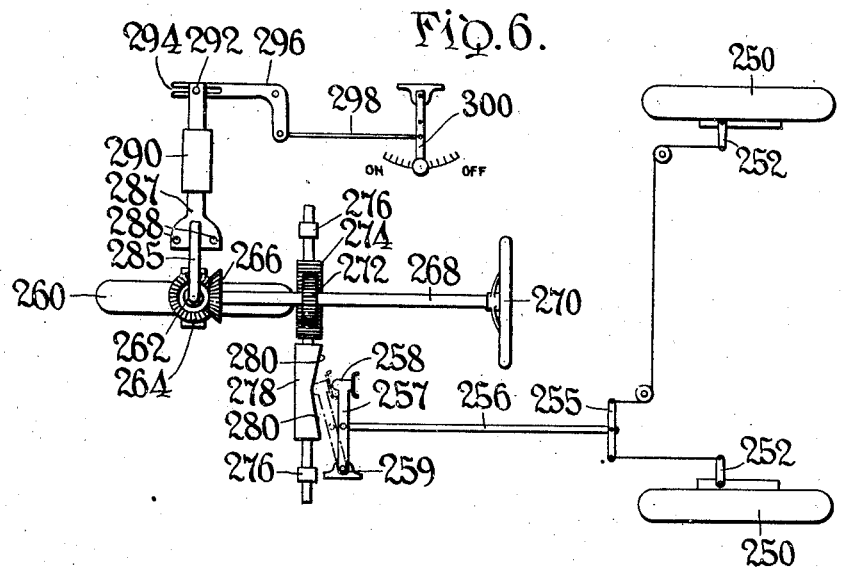
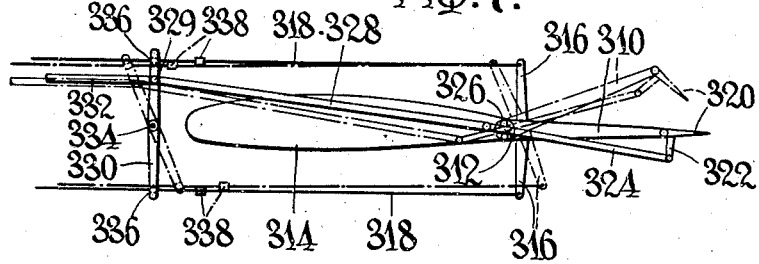
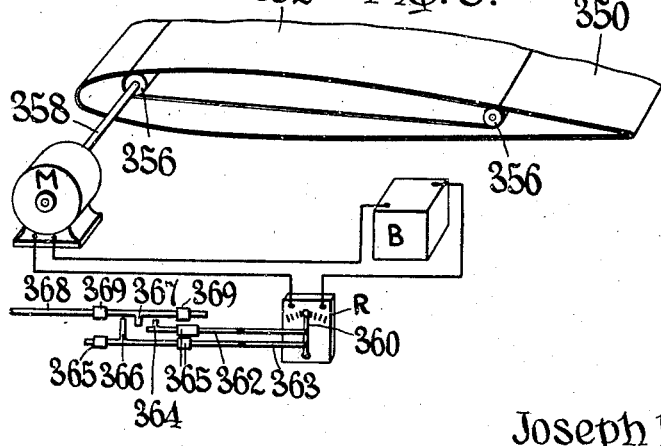
INVENTOR
Joseph M. Gwinn, Jr.
BY
Beau, Brooks, Buckley & Beau.
ATTORNEYS Patented Jan. 14, 1941

2,228,311

UNITED STATES PATENT OFFICE 2,228,311

AIRCRAFT

Joseph M. Gwinn, Jr., Buffalo, N. Y.

Application October 1, 1937, Serial No. 166,846

5 Claims. (Cl. 244—83)

This invention relates to aircraft, and more particularly to control means therefor.

In general, aircraft control elements comprise means for controlling the speed, direction and attitude of the craft movement under flight or ground or water travel conditions, by changing the external force system upon the aircraft. The control elements may be classified broadly as directional, longitudinal attitude, longitudinal thrust, and lateral attitude control means; and usually include specifically defined means such as airfoil contour changing means, airfoil circulation flow or lift changing means such as moving surfaces, engine speed control means, controllable pitch propellers, air rudders, elevators, ailerons, horizontal stabilizers, vertical fins, flaps, tabs, wheel brakes, ground steering means, and water steering means. Each of these control elements may be independently manipulatable by the pilot through means of separate actuating mechanisms, the proper correlation of which is necessary to safe and proper flight. Unfortunately, the proper correlation of these control manipulations requires meticulous practice at all times of a pilot-technique that may only be acquired as a result of specific ability and intensive training. For instance, pilot errors such as excessive use of the rudder under certain conditions of velocity and banking, or attempting to unduly stretch a glide, will inevitably produce stalls and spins; and it is an object of the present invention to provide an aircraft embodying an improved control means whereby the possibility of the aircraft being directed into a dangerous attitude of flight through unskilled or careless piloting, is eliminated.

The invention contemplates the use of stop means for limiting the possible movement of an aircraft control element; said stop means being actuated in response to movement of other elements of the aircraft to different positions of adjustment, whereby movements of the control means by the pilot are so limited as to be within an adjusted range of movement which is proper in view of prevailing conditions of motion.

This and more specific objects and advantages of the invention will become apparent from the following description of the typical embodiments illustrated in the accompanying drawings.

In the drawings:

Fig. 1 is a fragmentary diagrammatic illustration in elevation of longitudinal flight attitude control means embodying the invention;

Figs. 2, 3 and 4 are fragmentary diagrammatic illustrations of other forms of application of the invention to longitudinal flight attitude control means.

Fig. 5 is an enlarged view of a detail of the mechanism shown in Fig. 1;

Fig. 6 is a diagrammatic plan view of an aircraft ground travel control mechanism incorporating the principles of the invention;

Fig. 7 is a fragmentary diagrammatic plan view of directional flight control means embodying the invention, and Fig. 8 is a fragmentary diagrammatic view of variable lift control means adapted to an application of the principles of the invention.

As shown in the drawings, and referring now particularly to Fig. 1, the invention may be applied to a conventional type airplane structure comprising a front wing 10, a horizontal stabilizer 12, an elevator 14, and a wing flap 15. The elevator 14 is hingedly mounted upon a post 16, to which the stabilizer 12 is also pivotally connected, in any suitable manner whereby the stabilizer and the elevator are both free to be moved independently about the post 16 as a center. The elevator 14 is provided with a horn 18 rigidly extending therefrom to a point of pivotal connection 20 with a push-pull tube 22. The tube 22 is pivotally connected as at 24 to a rod 26 which is slidably mounted in a pair of spaced bearings 28, which are supported on the aircraft fuselage in any suitable manner. The opposite end of rod 26 is pivotally connected as at 30 to a tube 32 for pilot manipulation as by means of a lever 34 which is pivotally mounted upon the fuselage as at 36. The stabilizer 12 is provided with a horn 40 rigidly extending therefrom and carrying at its outer end in swiveling relation thereon an internally threaded nut 42. A threaded bolt 44 engages within the nut 42 and is connected at its forward end through means of a universal joint 46 with a rod 48 which extends forwardly to the pilot compartment of the aircraft. A thrust bearing 45, mounted on the aircraft fuselage maintains the bolt 44 in fixed longitudinal relation with respect to the aircraft fuselage. The forward end of the rod 48 is journaled in a swivel bearing 50, and is provided at its extreme end with a hand crank 52. Thus, the pilot may turn the crank 52 to move the stabilizer 12 about its pivotal connection to the post 16, to provide longitudinal balancing of the aircraft under different conditions of flight.

A rod 60 is pivotally connected at one end to an intermediate portion of the stabilizer post, as at 62, and is pivotally connected at its opposite end, as by means of a pin 64, to one end of a cross arm 65. The cross arm 65 is pivotally mounted, as at 66, upon a slide bar 68 which is supported by means of a pair of spaced bearings 70 upon the fuselage of the aircraft. The cross arm 65 is provided with an extending lug 72 adapted to abut a lug 74 extending upwardly from the bar 26 when the bar 26 is actuated in one direction of its sliding movement in the bearings 28. Thus, forward movement of the bar 26, in response to rearward movement of the pilot lever 34 to produce an upward movement of the elevator 14, will be limited by the co-action of the stop members 72 and 74.

Rotation of the crank 52 produces forward or rearward movements of the stabilizer arm 40 and corresponding upward or downward pivotal movements of the stabilizer 12 about the post 16. Simultaneously, any movement of the arm 40 actuates the lower end of the cross arm 65 forwardly or rearwardly as the case may be, and thus shifts the position of the stop 72 relative to the stop 74, as illustrated in broken lines in Fig. 1. Thus, it is seen that provision is made whereby movement of the stabilizer upwardly shifts the stop 72 to a position where it reduces the extent of possible upward movement of the elevator relative to the extent of possible upward movement of the elevator when the stabilizer is in a lowered position.

A beam 80 is pivotally mounted, as at 82, upon the bar 68, and has a pivotal connection 84 at one end to a push-pull tube 86. The opposite end of the tube 86 is pivotally connected, as at 88, to a throttle lever 90, which in turn is pivotally mounted as by means of a pin 91 upon any suitable supporting portion of the aircraft. A bar 92 connects the lever 90 to the aircraft engine throttle for varying the engine speed in accordance with movements by the pilot of the lever 90. The beam 80 is also pivotally connected, as at 94, to one end of a rod 96, the other end of which is connected to a horn 98 extending rigidly from the wing flap 15. A pedal 100 is shown as being operatively connected to the flap 15 by means of a rod 102 connected to the horn 98.

Thus, movement of the throttle lever 90 forwardly towards a throttle-on position will transmit a rearward motion to the slide bar 68 and to the stop 72, and vice versa, regardless of the previous position of the stop 72 as determined by the settings of the stabilizer and the wing flap. In a likewise manner, the application of pressure upon the pedal 100, to move the wing flap 15 downwardly to a high lift position, will cause the slide bar 68 and the stop 72 to move rearwardly, regardless of the previous position of the stop 72 as determined by the positions of the other connected control elements. Thus, a system of interconnecting stop adjusting means is provided in which the stop adjusting effects of the manipulations of the various control elements of the aircraft are merged into a composite resultant. Hence, control movements in certain combinations produce cumulative stop adjusting effects, and in other combinations produce opposed stop adjusting effects.

To insure against interference between the various control elements by reason of the interconnecting linkage, the pilot control members may each be provided with locking means. For instance, the threaded bolt and nut members 42 and 44 of the stabilizer actuating mechanism provide an irreversible actuating mechanism to prevent unintended shifting of the position of the stabilizer 12 as might otherwise occur in response to forces transmitted to the push-pull tube 60 in connection with pilot manipulation of the throttle, elevator, or wing flap adjusting mechanisms if some form of reversible actuating mechanism were employed, or any suitable form of friction or automatic or ratchet lock may be employed to prevent actuation of the control elements except in response to pilot manipulations of the respective actuating mechanisms. For example, a form of automatic lock is shown in Fig. 5 as applied to the throttle lever 90 in response to forces imposed upon the interconnecting link mechanism during adjustments of the other aircraft control elements. The locking mechanism comprises a pin 91 which extends from any suitable fixed supporting portion of the aircraft fuselage and a concentric annular base member 200 which is also fixedly supported upon a stationary portion of the aircraft structure and is provided with a perfectly round inner surface 201. The throttle lever 90 is mounted in freely pivotable relation upon the pin 91 as by means of an aperture 202, and is formed with a downwardly extending arm 204 upon which are fixedly mounted a pair of spaced laterally extending bosses 206.

A link 208 is pivotally mounted at its upper end upon the pin 91 and is pivotally connected at its lower end by means of a pin 210 to the tube 86 of Fig. 1. An intermediate portion of the link 208 extends adjacent the arm 204 and between the bosses 206. The distance between the bosses 206 is slightly greater than the width of the link 208 adjacent that point, and there is thus provided a lost motion connection between the lever 90 and the link 208 whereby rocking movements of the lever 90 about the pivot pin 91 will impart reverse rocking movements to the link 204 and reciprocal movements of the tube 86 but with delayed action at the beginning of each stroke of the lever 90.

The upper end of the link 208 is provided with an enlarged body portion 212 which in front elevation is generally elliptical in shape and concentric with the pin 91, and is formed with edge portions 214 which extend into the plane of the base member 200. Four lugs 216 formed integral with the lever 90 extend therefrom in pairs on opposite sides of the lever in substantially radiating relation with respect to the pin 91 and laterally from the lever 90 and thence into the space between the surfaces 201 and 214, thus completing the outline of a pair of opposed arcuate shape chambers 218.

The chambers 218 are thus similar and symmetrically disposed with relation to the axes of the device, and are of tapering arcuate shape, being of less width at each of their ends than at their centers. A pair of balls 220 and 221 are arranged in the left hand chamber, as viewed in Fig. 5, and a similar pair 222 and 223 are provided in the right hand chamber, and in the case of each pair the balls are resiliently urged apart by means of springs 224 towards the ends of the chambers 218. The inner ends of the lugs 216 are adapted to bear against the balls when the lever 90 is rotated upon the pin 91. The balls 220, 221, 222, and 223 are of such diameter that when they are disposed in the ends of the chambers they contact each of the surfaces 201 and 214 and thus provide wedges to resist movements of the body 212 relative to the base 200. Hence, the balls normally lock the link 208 against movements about the pivot pin 91

Movement of the lever 90 to the right or left however, will first force the balls 222 and 221 or the balls 220 and 223, as the case may be, towards the centers of their respective chambers against the action of the springs 224, and thus release the balls from their locking action while the lost motion connection between the bosses 206 and the link 208 is being traversed. Further movement of the lever will then cause the link 208 to pivot about the pin 91 and simultaneously actuate the engine throttle rod 92 and the stop actuating tube 86. Upon release of actuating pressure on the lever 90, the springs 224 realign the lever 90 and the link 208 and move the balls into locking engagement with the members 200 and 212, thus automatically locking the throttle control device in its adjusted position from whence it may only be moved in response to pilot manipulation of the lever 90. It will be apparent that forces transmitted to the tube 86 through connected mechanism for actuating the other control elements of the airplane will be prevented from moving the link 208 or causing any change in the throttle setting.

Another form of control locking means is illustrated in Fig. 1 as applied in connection with the push-pull 102 wherein a pair of semi-cylindrical shoes 104 are slidably fitted about the tube 102 and maintained thereon by means of an embracing yoke 108. A rod 106 is mounted in screwthreaded relation in a threaded aperture through the upper portion of the yoke and has its lower end bearing against the upper shoe 104 and is adapted to be rotated manually by the aircraft pilot for alternate tightening and loosening of the shoes 104 with reference to the tube 102. The rod 106 is supported in vertically slidable relation in a bearing 107 fixed to any convenient portion of the aircraft fuselage. Thus, rotation of the threaded rod 106 into a shoe-clamping position provides a positive friction lock for preventing longitudinal movement in either direction of the tube 102, and when so adjusted, the flaps 15 will be maintained in any predetermined position and will not be effected by forces transmitted through interconnected actuating mechanisms and tube 96 in response to movements of other control members. Rotation of the rod 106 in an opposite direction releases the clamping action of the shoes 104 and permits adjustment of the flap 15 and movement of the tube 102.

It is contemplated that the elements of the devices shown herein may be rearranged to provide any variety of effects, to suit the requirements of any particular aircraft and the type of performance desired. For instance, the embodiment shown in Fig. 1 and described herein will provide for an increased restriction of possible up-elevator movement as a result of: (a) adjustments of the stabilizer to raise its leading edge; or of (b) movements of the throttle towards throttle-on position; or of (c) depression of the wing flaps. In some types of aircraft such an arrangement will give the results desired because: (a) with leading edge of stabilizer up, less up-elevator (with relation to its original neutral angular position) is required to procure the same turning moment; and (b) with the throttle-on, the increased air-stream over the tail surfaces reduces the degree of elevator deflection necessary to procure the same turning moment; and (c) with wing flaps down, an increased downwash from the flaps increases the downward load on the tail surfaces and therefore reduces the magnitude of the down pressure required on the elevator to achieve any desired attitude of flight.

In other types of aircraft different reactions to these control adjustments may be required, but it will be apparent to anyone skilled in the art how the principles of the invention may be applied to procure any other result or combination of results. Also, the relative magnitude of the effects procured by manipulation of the various control elements may be varied to suit different conditions of aircraft design and performance desired by varying the arrangement and proportioning of the elements of the stop actuating mechanism. It is contemplated that the principles of the invention may be applied with equal facility to limit the downward movement of the elevator by providing a stop actuating mechanism as illustrated in Fig. 4 wherein the elevator-actuated rod 126 is adapted to be operatively connected to the elevator horn 18 and is provided with a stop lug 174 in a manner similar to the arrangement of the rod 26 and the lug 74 of Fig. 1. A cross beam 165, carrying a stop lug 172, is pivotally conected at one end to a throttle and flap actuated slide rod 168 and at its opposite end to a stabilizer-actuated tube 160. Thus, the arrangement is analogous to the arrangement of the corresponding parts 65, 72, 68 and 60 in Fig. 1, with the exception that in this latter form of arrangement the stop elements 172 and 174 are adapted to coact to limit the movement of the tube 126 toward the right (as viewed in the figure) and thus to limit movements of the elevator 14 downwardly from its neutral free floating position.

It is contemplated that the invention may be adapted to limit the movements of any other control element of an aircraft in any manner desired. For instance, Fig. 6 illustrates a ground wheel control mechanism wherein a pair of directionally fixed ground wheels 250 are shown as being provided with braking mechanisms operable by levers 252 through means of a flexible cord and pulley system interconnected with an equalizer bar 255. A draw bar 256 is pivotally connected to the equalizer bar and to a pedal lever 257 which is fulcrumed upon some convenient portion of the fuselage as at 259. Thus the application of pressure upon the upper end of the pedal 257 will move the upper end of the pedal to the left, as viewed in Fig. 6, to actuate the levers 252 for applying the wheel brakes.

A steerable ground wheel 260 is shown as being mounted in directionally pivotable relation upon the fuselage as by means of a forked post 262 supported on a bearing (not shown) supported upon a fuselage. A beveled gear 264 mounted concentrically upon and keyed to the post 262 and a companion gear 266 mounted upon a steering post 268 provide means for adjusting the wheel 260 directionally upon rotation of the hand wheel 270. A spur gear 272 is fixedly mounted upon the steering column 268 for engagement with a geared bar 274 which is slidably mounted upon the fuselage by means of a pair of bearings 276. An intermediate portion 278 of the geared bar is provided with a pair of opposed inclined side surfaces 280. The surfaces 280 are so arranged that when the steering wheel 260 is in a straight forward position and the geared bar 274 is in a neutral position, the central point of connection of the surfaces 280 coincides with the position of a boss 258 extending laterally from the pedal 257 when the pedal is moved forwardly to a brake-on position, as illustrated in broken lines. The members of the mechanism are so proportioned and arranged in spaced relation so that when the rack bar 274 is in neutral position the pedal 257 has ample room to travel to effect a full brake-on actuating movement. It will be apparent, however, that whenever the hand wheel 270 is rotated to turn the steering wheel 260 out of a straight line of travel position that the rack bar 274 will be shifted in either one of its possible directions of sliding movement whereby the position of the inclined surfaces 280 relative to the pedal boss 258 will be altered in such manner as to prevent full brake-on application movements of the pedal 257. The degree of brake-on application movements which are possible will depend upon the magnitude of the shift of the rack bar away from its neutral position. Thus, means have been provided whereby the application of brake actuating movements of the pedal 257 by the pilot will be increasingly restricted as the steering wheel 260 moves away from a straight line of travel position, and the severity of the braking action which it is possible for the pilot to impress upon the system will vary reversely with the severity of any coincidental directional turning maneuver. Hence the parts may be so proportioned and the aircraft so designed that the pilot will be prevented from capsizing the craft by too severe applications of brakes during turning maneuvers.

The upper end of the steerable wheel post 262 is provided with an integral laterally extending arm 285. A stop block 287 provided with a pair of outstanding spaced bosses 288 is slidably mounted in a bearing 290 and pivotally connected as at 292 to the slotted end 294 of a bell crank 296, the opposite end of which is pivotally connected to a push-pull tube 298 which is adapted to be actuated in response to movements of an aircraft engine throttle lever 300. The bosses 288 of the stop block 287 extend into the plane of movement of the arm 285, and are thus adapted to limit the angular rotation of the arm 285 about the axis of the wheel post 262. It will be apparent that actuation of the throttle lever 300 to different positions of engine speed adjustment will simultaneously shift the stop block 287 longitudinally through the bearing 290, thus altering the distance between the bosses 288 and the wheel post 262 and the permissive angular rotation of the arm 285. Thus, means have been provided for limiting the amount of turning movement which may be applied to the steering wheel 260 by the pilot in accord with the aircraft engine speed.

Figure 7 illustrates an application of the principles of the invention to an aircraft rudder and trim-tab mechanism wherein a rudder 310 is hinged as at 312 to the trailing edge of a vertical fin 314. A pair of horns 316 extend laterally from the rudder and are connected to opposite control cables 318 for manipulation by the pilot of the aircraft to procure directional turning movements of the rudder about the line of hinge 312. A trim tab 320 is hingedly mounted upon the trailing edge of the rudder 310 and is provided with a laterally extending horn 322 for actuation by the pilot through means of a push-pull tube 324. The opposite end of the push-pull tube 324 is slidably mounted and maintained in axial intersecting relation with respect to the hinge 312 by means of a pair of guides or rollers 326 to avoid angular movements of the trim-tab relative to the rudder in response to pilot adjustments of the rudder setting. The opposite end of the tube 324 is pivotally connected to one end of a push-pull tube 328, the other end of which is pivotally connected as at 329 to a cross bar 330. A push-pull tube 332 extending from the trim-tab pilot actuating mechanism (not shown) is also pivotally connected to the cross bar 330. The cross bar 330 is pivotally connected as at 334 to the aircraft fuselage. Hence longitudinal movements of the tube 332 in response to actuation of the pilot adjusting mechanism rotates the cross bar 330 and actuates the tubes 328 and 324 to procure angular movement of the trim-tab 320 relative to the rudder 310. The cross bar 330 is provided with a pair of apertures 336 adapted to receive the cables 318 in sliding relation therein.

A bead 338 is fixedly mounted upon each of the cables 318 in similar spaced relation with respect to the opposite ends of the cross bar 330 when the cross bar and the rudder 310 are both in neutral positions, said beads being adapted to abut the cross bar upon movement of the rudder cable to restrict the maximum possible pilot movements of the rudder within predetermined limits. As illustrated in broken lines, when the tube 332 is moved to the left as viewed in Fig. 7, the cross bar is moved to the broken line position and the trim-tab is rotated about its hinged connection to the rudder. This deflection of the trim tab outwardly into the adjacent airstream creates a turning moment about the line of hinge 312 which results in moving the rudder 310 toward the position shown in broken lines. This movement of the rudder is accompanied by an adjusting movement of the rudder control cable 318 which shifts the beads 338 to the broken line positions shown. Thus means have been provided whereby maximum permissible manipulation by the pilot of the aircraft rudder is limited in view of the relative position of the articulated trim tab. Also, means have been provided whereby deflection of the trim tab into the adjacent airstream accompanied by a corresponding shift in position of the rudder is accompanied by mutual adjustments of the related stop means whereby the neutral position of the rudder with respect to the stop means is unaltered, and equal rudder movements in opposite directions from its neutral position are available to the pilot.

Figure 8 illustrates an application of the principles of the invention to a lift varying means of the moving skin airfoil type. In the figure, an airfoil 350 of the conventional wing type is illustrated as having a portion of its upper surface formed by the upper side of an endless flexible belt 352 supported upon a pair of opposed rollers 356. One of the rollers 356 is driven through means of a shaft 358 by an electric motor M which derives its source of power from a battery B.

The motor M is of the variable speed type, and a rheostat R is connected in the power transmission line for controlling the speed of the motor in response to pilot adjustments of a rheostat lever 360. A pair of push-pull tubes 362 and 363 respectively are pivotally connected to the rheostat lever 360, and at their opposite ends are slidably supported in bearings 365. Adjacent their respective ends the tubes 362 and 363 are provided with laterally extending arms 364 and 366, respectively, for cooperation with a similarly extending arm 367 carried by a push-pull tube 368 which is slidably mounted in bearings 369. Hence, it will be apparent that longitudinal movements of the tube 368 will be restricted in accord with the relative setting of the rheostat lever 360, and that this form of the device may be employed to provide adjustably restricted movements of any pilot control member which may be connected to the tube 368, the character of the restriction varying with changes in the speed with which the belt 352 is rotating.

It is contemplated that the invention may be applied to the restriction of any means for changing the external force system upon an aircraft such as means for accomplishing directional, lateral, longitudinal attitude, or longitudinal thrust control of an aircraft, either in connection with flight or ground or water travel conditions; and the term "longitudinal thrust" as used herein is intended to cover the forces applied through the aircraft propeller or brakes in directions substantially parallel to the thrust axis of the aircraft. For instance, the possible degree of rudder deflection may be restricted in conformity with the position of the landing flaps and/or the engine speed; and the range to which rudder deflection is restricted may be varied in accordance with changes in the condition of these control elements. For example, when flying with power full-on and under increased velocity conditions it is desirable to reduce the degree of possible rudder deflection to prevent the pilot from applying full rudder and causing the generation of excessive turning moments with attendant hazards of structural strain and loss of control. Likewise, the invention may be adapted to restrict rudder deflection when the landing flaps are in a downward or high lift position, to obviate the hazard of loss of control and spinning which might otherwise result from pilot errors under such conditions. Also, it is contemplated that the principles of the invention may be applied to limit the degree of possible pilot-manipulation of the throttle in accord with the attitude of the elevator, or the stabilizer, or the wing flaps, or the rudder, or of a combination of these control elements. Hence, it is contemplated that the invention has application to restriction of the actuation of any aircraft flight control means, such as; an elevator, a stabilizer, a wing flap, an aileron, an engine throttle, a rudder, a trim tab or any other device for effecting a change of condition of aircraft movement, either in connection with flight or ground travel.

To provide for predetermined variations in the relative magnitudes of maximum movements of a control element in opposite directions away from its neutral position, the control element actuating means may be arranged in a predetermined functional relationship with respect to movements of another of the aircraft control elements. For instance, the relative magnitudes of maximum movements of the flap 14 in opposite directions away from its neutral trailing position may be caused to be varied by arranging the stop and flap actuating means in a predetermined functional relationship with respect to movements of the stabilizer. Pivotal adjustments of the stabilizer 12 result in alterations of the mean direction of the airstream surrounding the flap 14, and for each position of adjustment of the stabilizer there is a different free floating neutral position for the flap 14 involving a different angular relation between the center lines of the stabilizer and the flap. Hence, each different neutral position of the flap involves a different angular relation with respect to the aircraft fuselage, and for each change in stabilizer position the flap will automatically tend to assume a new neutral position under the influence of airstream pressures, and the neutral position of the tube 22 and the stop 74 will shift accordingly. Thus, a second factor effecting the relation of the stop elements is introduced into the operation of the mechanism, and it will be seen that the relative maximum movements of the flap above and below neutral positions are thereby varied.

As illustrated in Fig. 2, the stop actuating means of Fig. 1 may be so arranged as to automatically control the ratio of the relative maximum movements of the control flap in opposite directions away from neutral positions. In this form of arrangement, which also illustrates the invention as being applied to an elevator restricting mechanism, the stabilizer 12 is pivotally mounted as at 110 upon the fuselage of the aircraft at a point intermedially of the stabilizer and the elevator is hinged as at 17 to the trailing edge of the stabilizer. The elevator control tube 22 is slidably maintained at a predetermined constant distance from the axis of the pivotal connection 110, as by means of a pair of spaced guide rollers 112 which are rotatably mounted upon any suitable support such as a horn 114 extending rigidly from the stabilizer 12. Thus, movement of the stabilizer 12 to adjusted positions for longitudinal balancing purposes actuates the stop 72 to adjusted positions in a manner similar to that explained hereinabove in connection with Fig. 1; and adjustment of the stabilizer to a nosedown position moves the stop 72 forwardly, or to the left, as illustrated in broken lines in Fig. 2.

In response to the change in the mean direction of the airstream immediately behind the stabilizer 12 caused by the adjustment of the stabilizer from the solid line position to the broken line position of Fig. 2, the elevator 14 will move from its original free floating neutral position $E_1$ to a new free floating neutral position along a line $E_2$ involving a different angular relation with respect to the fore and aft center line S of the stabilizer. For instance, assuming the solid line position of the stabilizer to be at a zero angle of attack, then the solid line position of the elevator 14 will represent a neutral free floating trailing position, wherein E, (the aerodynamic center line position of the elevator) will coincide with Z (the aerodynamic center line of the stabilizer). Upon movement of the stabilizer to its broken line position, the elevator will move to a position along line $E_2$, which will be disposed at some angle intermedially of the angles at which lines Z and S (the aerodynamic center line of the stabilizer in its adjusted broken line position) are disposed. Hence, the elevator horn 18 will be moved forwardly and will procure a corresponding forward adjusting movement of the stop 74, as, for example, to the broken line position indicated in Fig. 2. The relative magnitudes of the simultaneous adjustments of the stops 72 and 74 under such conditions will determine the net difference in relative positions of the stop elements 72 and 74. In connection with either position of stabilizer adjustment, however, the elevator is in a neutral free floating position behind the stabilizer. Hence, the amount of possible movement of the elevator 14 from a neutral position upwardly has been varied accordingly.

The maintenance of any predetermined spaced relation between the elevator control tube 22 and the stabilizer pivotal axis 110 will permit the elevator 14 to assume adjusted neutral positions and different angular relations with respect to the fore and aft axis of the stabilizer upon movement of the stabilizer, accompanied by any desired change in the position of the stop 74, and the amount of change in the position of the stop 74 due to this factor will depend upon the magnitude of the distance between the tube 22 and the line of hinge 110.

Fig. 3 illustrates another form of the invention embodying means for varying the ratios of movements of a control element in opposite directions away from neutral. In this instance, the invention is also shown as being applied to a restrictive control mechanism for the elevator 14, but obviously it may have application to any other control element of an aircraft. The elevator is provided with a horn 18 to which is operatively connected one end of a push-pull tube 22. The opposite end of the tube 22 is pivotally connected to a pilot lever 116 which is pivotally mounted upon the aircraft at 117, and is provided with a lower angularly extending portion 118. The portion 118 is provided with a slot 119 for receiving therein a headed pin 120 for maintaining the end of the tube 22 and the lever portion 118 in sliding and pivotally connected relation. An engine throttle lever 123, in the form of a bell crank, is connected at its offset end with a control rod 124 which in turn supports a hanger 125 embracing the adjacent end of the tube 22.

Hence, pivotal movements of the throttle lever 123 to alter the aircraft engine speed will raise or lower, as the case may be, the adjacent end of the tube 22 with relation to the point of pivotal connection 117 of the elevator control lever 116 to the aircraft frame structure. A pair of opposed stop lugs 121 and 122 mounted upon and extending from any suitable supporting structure of the aircraft are provided to positively limit the possible movements of the control lever 116 in either direction of its movement.

Thus, it will be apparent that manipulation of the throttle lever 123, as to the broken line position of Fig. 3, will lower the tube 22 and move the elevator lever 116 about its pivot 117 to the broken line position as indicated. Thus, the lever 116 is shifted in relation to the stops 121 and 122, and the ratio of possible maximum movements of the elevator 14 upwardly and downwardly with respect to its neutral position has been altered. Also, the possible total combined up and down motion of the elevator has been increased.

It is contemplated that the invention is adapted to application in connection with automatically actuated aircraft control means. For instance, as shown by way of illustration in Fig. 1, the elevator 14 may be provided with an automatic actuating means as indicated at A which is operably coupled with the lever 34 by means of a tube 35; and in a similar manner, any one of the other control elements of an aircraft may be coupled with an automatic actuating means and adjustable restrictive means for limiting the operation of the automatic actuating means. Furthermore, any suitable form of gravity-controlled or gyroscopic mechanism may be interconnected with a stop element adjusting means to provide an automatically adjusted restrictive device for limiting the manipulation of an aircraft control element in response to changes in flight conditions which effect the condition of the automatic control device. The invention contemplates, therefore, application in connection with any type of aircraft flight control element, either pilot-operated or of the automatically actuated types.

Although only a limited number of forms of the invention may have been shown and described in detail, it will be apparent to those skilled in the art that the invention is not so limited but that various changes may be made therein without departing from the spirit of the invention or from the scope of the appended claims.

I claim:

1. In an aircraft, a plurality of control elements consisting of at least three control elements and separate pilot-operable actuating means for each of said control elements, stop means for limiting the possible pilot manipulation of one of said control elements, and means associated with each of the other of said control actuating means and with said stop means in such manner that manipulations of the other of said control elements produce stop adjusting effects which are resolved into a single stop adjusting effect for adjustment of said stop whereby manipulation of said first mentioned control means is limited in accord with conditions of motion as determined by control effects produced by the other of said control elements.

2. In an aircraft, a plurality of control elements comprising at least three control elements and separate pilot-operable actuating means for each of said control elements, stop means for limiting the possible pilot manipulation of one of said control elements, and means associated with each of the other of said control actuating means and with said stop means in such manner that manipulation of either of the other of said control elements alters the ratio of possible movements of said one of said control elements in opposite directions away from a neutral position.

3. In an aircraft, a pilot adjustable engine power control means, an elevator, a pilot adjustable elevator control means, and a positive stop member movable in response to adjustment of said power control means and operatively associated with said elevator control means for increasingly limiting possible adjustments by the pilot of said elevator control means for upward tilting of said elevator under increasing power conditions.

4. In an aircraft, a pilot adjustable engine power control means, an elevator, a pilot adjustable elevator control means, and a positive stop member movable in response to adjustment of said power control means and operatively associated with said elevator control means for increasingly limiting possible adjustments by the pilot of said elevator control means for downard tilting of said elevator under decreasing power conditions.

5. In an aircraft, a pilot adjustable engine poweer control means, a wing flap, a pilot adjustable wing flap control means, and a positive stop member movable in response to adjustment of said power control means and operatively associated with said wing flap control means for increasingly restricting adjustments by the pilot of said wing flap control means for downward tilting of said wing flap under increasing power conditions.

JOSEPH M. GWINN, Jr.